(12) United States Patent
Stahlhut et al.

(10) Patent No.: US 7,471,008 B2
(45) Date of Patent: Dec. 30, 2008

(54) METHOD AND SYSTEM FOR CONTROLLING A ROTATIONAL SPEED OF A ROTOR OF A TURBOGENERATOR

(75) Inventors: Ronnie Dean Stahlhut, Bettendorf, IA (US); Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 326 days.

(21) Appl. No.: 11/514,761

(22) Filed: Sep. 1, 2006

(65) Prior Publication Data

US 2007/0210583 A1   Sep. 13, 2007

Related U.S. Application Data

(60) Provisional application No. 60/781,169, filed on Mar. 10, 2006.

(51) Int. Cl.
| F01D 15/10 | (2006.01) |
| F02C 6/00  | (2006.01) |
| H02K 7/18  | (2006.01) |
| H02P 9/04  | (2006.01) |

(52) U.S. Cl. .......................... 290/52; 322/28
(58) Field of Classification Search .................... 290/52, 290/40 B, 40 C, 51; 60/772, 773
See application file for complete search history.

(56) References Cited

U.S. PATENT DOCUMENTS

| 4,267,458 A | * | 5/1981 | Uram et al. ............... 290/40 R |
| 4,629,968 A | * | 12/1986 | Butts et al. ..................... 322/29 |
| 4,665,704 A |   | 5/1987 | Hartwig ........................ 60/597 |
| 4,955,199 A |   | 9/1990 | Kawamura .................... 60/608 |
| 5,170,065 A | * | 12/1992 | Shimizu et al. ........... 290/40 C |
| 5,570,001 A | * | 10/1996 | Fenley ......................... 322/36 |
| 6,012,289 A |   | 1/2000 | Deckard et al. .............. 60/602 |
| 6,118,186 A | * | 9/2000 | Scott et al. ................ 290/40 B |
| 6,812,586 B2 |   | 11/2004 | Wacknov et al. .............. 290/52 |
| 7,336,000 B2 | * | 2/2008 | Stahlhut et al. ............... 290/52 |
| 2001/0017235 A1 | * | 8/2001 | Suga et al. ................... 187/290 |
| 2003/0015979 A1 | * | 1/2003 | Karwath ..................... 318/254 |
| 2003/0107349 A1 | * | 6/2003 | Haydock et al. .............. 322/28 |
| 2003/0111842 A1 | * | 6/2003 | Gilbreth et al. ............... 290/52 |
| 2004/0178641 A1 | * | 9/2004 | Wall ............................ 290/52 |
| 2007/0246942 A1 | * | 10/2007 | Stahlhut et al. ........... 290/40 A |

FOREIGN PATENT DOCUMENTS

WO    WO 02/50618 A2    6/2002

* cited by examiner

*Primary Examiner*—Julio Gonzalez

(57) ABSTRACT

A system and method controls a rotational speed of a rotor or shaft of a turbogenerator in accordance with a present voltage level on a direct current bus. A lower threshold and a higher threshold are established for a speed of a rotor or shaft of a turbogenerator. A speed sensor determines speed data or a speed signal for the rotor or shaft associated with a turbogenerator. A voltage regulator adjusts a voltage level associated with a direct current bus within a target voltage range if the speed data or speed signal indicates that the speed is above the higher threshold or below the lower threshold.

16 Claims, 5 Drawing Sheets

METHOD AND SYSTEM FOR CONTROLLING A ROTATIONAL SPEED OF A ROTOR OF A TURBOGENERATOR

This document (including all drawings) claims priority based on U.S. provisional application Ser. No. 60/781,169, filed Mar. 10, 2006, under 35 U.S.C. 119(e).

This invention was made with U.S. government support under Cooperative Agreement No. DE-FC26-05NT42422 awarded by the Department of Energy (DOE). The U.S. government has certain rights in this invention.

FIELD OF THE INVENTION

The present invention relates to a method and system for controlling a rotational speed of a rotor of a turbogenerator.

BACKGROUND OF THE INVENTION

A turbogenerator may comprise a turbine that is mechanically coupled to a generator. A rotor (e.g., turbine blade) associated with the turbine or the generator may have a rotational speed. Where the turbine is fed by exhaust gas of an internal combustion engine or steam associated therewith; a nozzle, injector, or electromechanical valve, solenoid, or the like may be controlled to manage the speed of the rotor. However, the nozzle, injector, electromechanical valve or solenoid may be subject to damage and reliability problems because of the thermal conditions associated with the exhaust stream or the byproducts of the combustion process. Accordingly, there is a need to control the rotational speed of the rotor of the turbogenerator that overcomes the aforementioned reliability problems.

SUMMARY OF THE INVENTION

The system and method controls a rotational speed of a rotor or shaft of a turbogenerator in accordance with a voltage level associated with a direct current bus. A lower threshold and a higher threshold are established for a speed of the rotor or shaft of the turbogenerator. A speed sensor determines speed data or a speed signal for the rotor or the shaft associated with a turbogenerator. A voltage regulator adjusts a voltage level associated with the direct current bus within a target voltage range if the speed data or speed signal indicates that the speed is above the higher threshold or below the lower threshold.

DESCRIPTION OF THE PREFERRED EMBODIMENT

Figure 1:
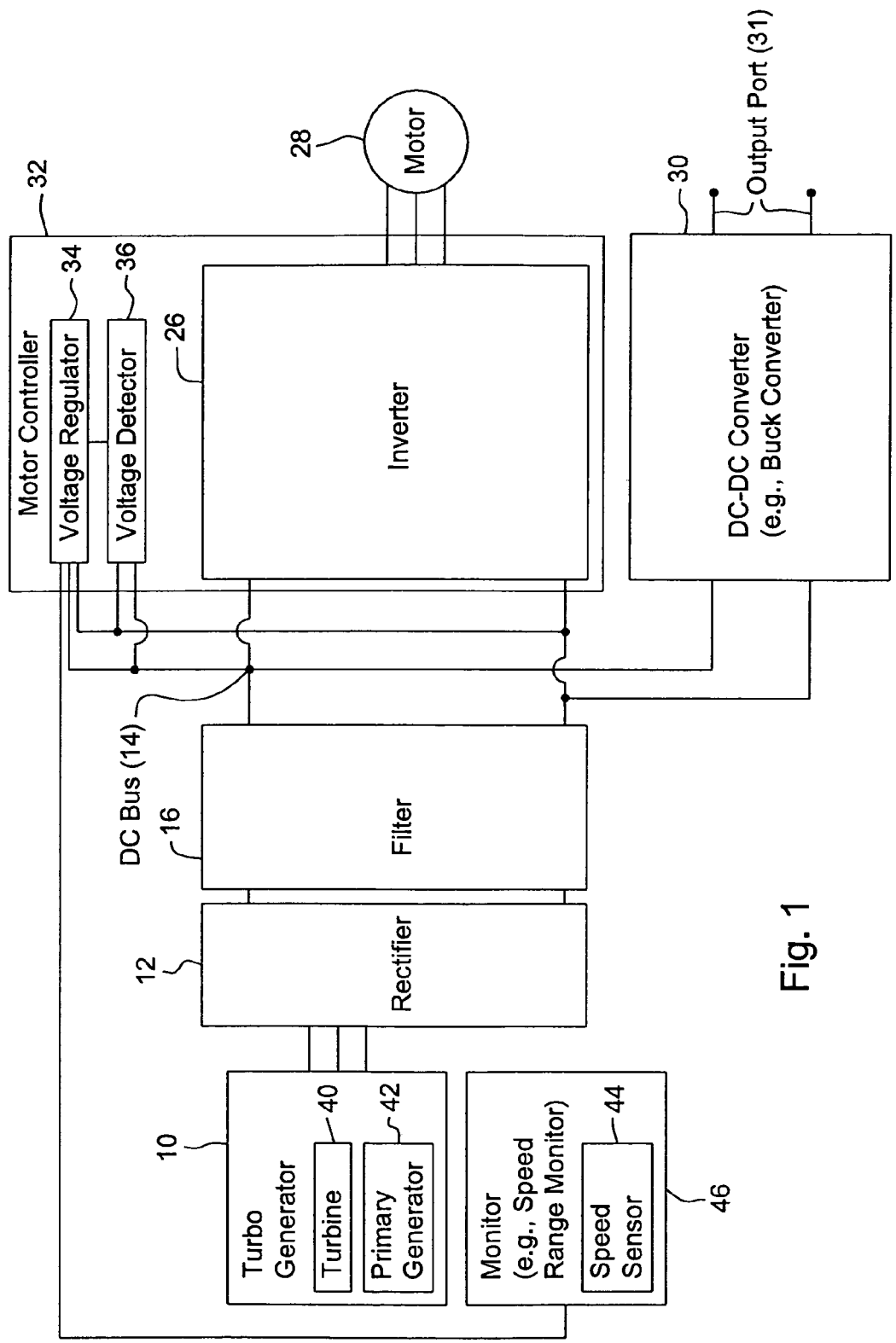
FIG. 1 is a block diagram of one embodiment of a system for adaptively controlling a rotational speed of a rotor.
Figure 2:
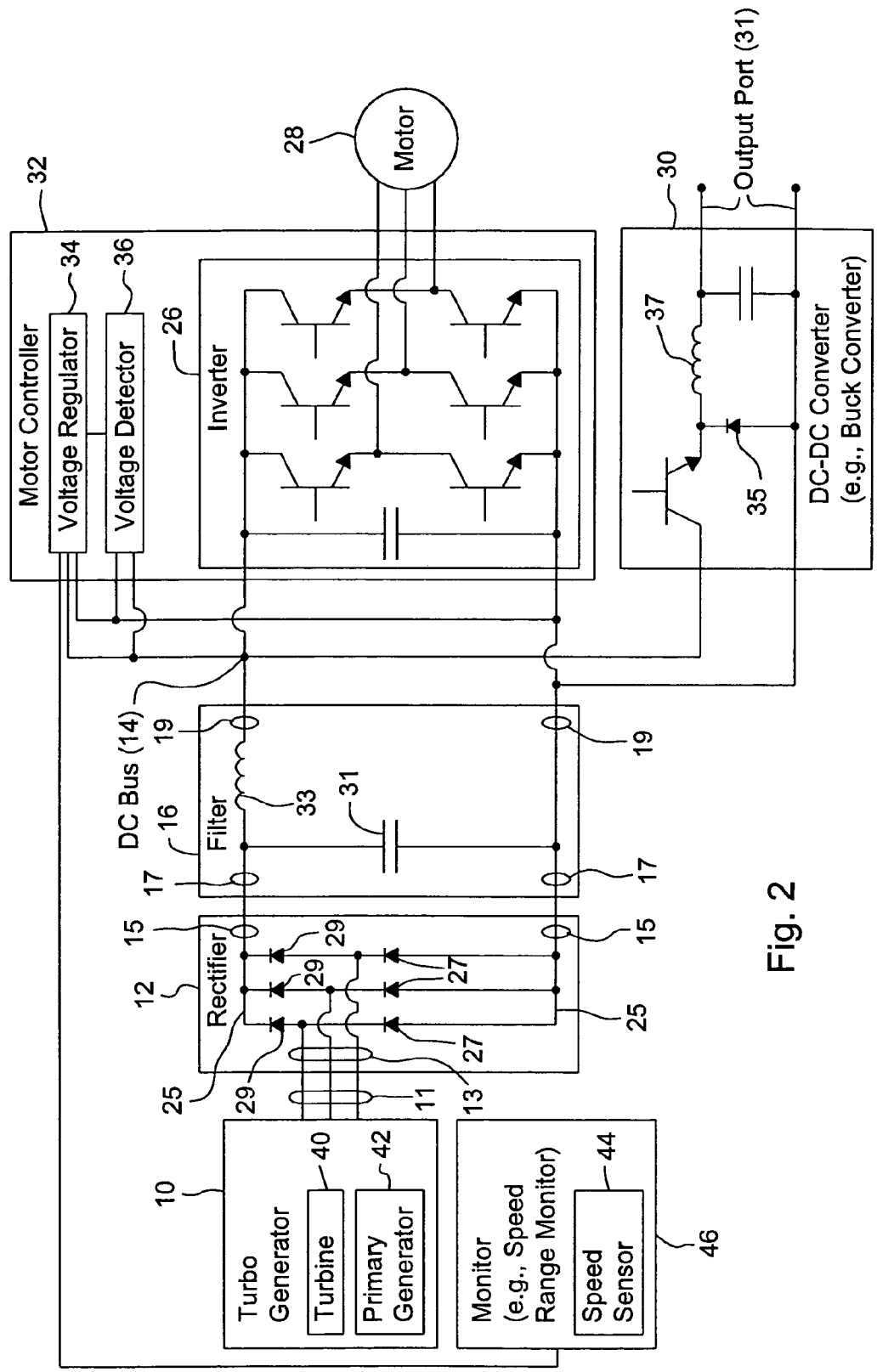
FIG. 2 shows illustrative schematic components that may be used to carry out the block diagram of FIG. 1.

In FIG. 1 and FIG. 2, a turbogenerator electrical output 11 of a turbogenerator 10 is coupled to a rectifier input 13 of a rectifier 12. A rectifier output 15 of the rectifier 12 is connected to a filter input 17 of filter 16. The filter 16 filters the direct current signal for the direct current (DC) bus 14. A filter output 19 of the filter 16 is coupled to an inverter 26. The inverter 26 communicates a control signal (e.g., variable frequency or variable pulse width modulated signal) to an electric drive motor 28. A converter 30 (e.g., DC-DC converter) is coupled across the direct current bus 14 to provide a direct current (DC) output port 31 (e.g., high voltage DC output port).

In one embodiment, the motor 28 comprises: (a) a motor or electric drive in a propulsion mode and (b) a generator or alternator during a power generation mode. In the propulsion mode, the motor is capable of rotating a motor output shaft, whereas in the power generation mode the generator converts mechanical rotational energy into electrical energy. It is understood by those of skill in the art that the terms "motor/generator", "generator", "alternator" could be used generally interchangeably with "motor," without any loss of functionality, limitation of mode, or meaning with the caveat that "alternator" may appropriately refers to alternating current (AC) configurations.

A speed sensor 44 is associated with a rotor or shaft of the primary generator 42 or the turbine 40. The speed sensor 44 provides a sensor signal or sensor data to a monitor 46. The speed sensor 44 may comprise an electromagnetic speed sensor, a Hall effect speed sensor, an optical speed sensor, a mechanical speed sensor, or another suitable speed sensor that measures a rotational speed, velocity, or number of revolutions of the shaft or rotor. In one illustrative configuration, the first sensor 18 may monitor a number of voltage pulses per unit time associated with the rectifier 12 or the back electromotive force (EMF) produced in the windings of the primary generator 42 to infer or estimate the rotational speed of the shaft, rotor, turbine, or turbine blades. In another illustrative configuration, an electromagnetic speed sensor may include a magnetic element (e.g., magnet) arranged for rotation with the rotor or shaft of the turbogenerator 10 and a stationary sensing coil mounted in proximity to the magnetic element to detect changes the current (or voltage) that facilitate measurement of the rotational speed of the shaft or rotor. Further, the speed sensor 44 may include a timer or clock for determining the number of revolutions per time unit (i.e., the rotational speed of the shaft or the rotor of the turbogenerator 10). The monitor 46 supports monitoring of the speed or range of speed of the rotor or shaft of the primary generator 42 or the turbine 40.

In one embodiment, the motor controller 32 comprises a voltage regulator 34 and a voltage detector 36. The voltage regulator 34 regulates the direct current voltage level associated with the DC bus 14. The voltage detector 36 detects the direct current voltage level associated with the DC bus 14. The voltage detector 36 may comprise a resistive divider or ladder to scale down the voltage level from the DC bus 14 to suitable voltage for an analog-to-digital converter (A/D) converter of the voltage detector 36.

The voltage regulator 34 regulates the voltage level or voltage operating point associated with the direct current (DC) bus 14 based upon input from the voltage detector 36, the monitor 46, or both. For example, the voltage regulator 34 may shunt voltage to ground through a resistance (of resistors or semiconductor components configured as resistors, or otherwise) if the voltage detector 36 determines that the direct current voltage level or voltage operating point of the direct current bus 14 exceeds a target voltage range or if the motor controller 32 instructs the voltage level or voltage operating point to be decreased to manage the speed of a rotor or shaft associated with the turbogenerator 10.

The monitor 46 may comprise a microcontroller, a logic unit, a programmable logic device, a digital signal processor, or another data processor. The monitor 46 may set one or more of the following: a desired voltage level, a voltage operating point, a minimum voltage level, maximum voltage level, and a target voltage range based upon a measured rotor/shaft speed of the turbogenerator 10 (e.g., the turbine 40 or the primary generator 42), with respect to a corresponding desired rotor/shaft speed or desired speed range for operation of the turbogenerator 10 (e.g., the turbine 40 or the primary generator 42). The desired speed is determined by how efficiently and reliably the turbogenerator operates at a corresponding desired speed to generate a suitable electrical energy signal (e.g., alternating current waveform) of sufficient voltage amplitude and current level for the load (e.g., predominately resistive load) on the DC bus 14.

In one embodiment, the turbogenerator 10 comprises a turbine 40 (e.g., an exhaust driven turbine) in communication with exhaust gas or steam associated with an internal combustion engine. Although the internal combustion engine may be run at target or target range of revolutions per unit time (e.g., 1,800 to 2,200 revolutions per minute) of a shaft (e.g., crankshaft) for efficient operation, the internal combustion engine may be run at virtually any revolutions per unit time within its operational range. A fuel delivery system (e.g., fuel injection system or carburetion system) may be associated with a controller (e.g., regulator) for metering or otherwise regulating the flow of fuel to maintain the target or target range of revolutions per unit time, for example. The turbine 40 is mechanically coupled to a primary generator 42 (e.g., alternator) that generates electrical energy that may be used by one or more components of the vehicle. The voltage level output of the turbogenerator 10 is generally directly proportional to the rotational speed of the shaft or rotor of the turbogenerator 10.

In one embodiment, the rectifier 12 comprises pairs of diodes (27, 29). Each pair comprises a firs diode 27 coupled in series to a second diode 29. An anode of the first diode 27 is coupled to one rail of the rectified DC bus 25, whereas a cathode of the second diode 29 is coupled to another rail of the rectified DC bus 25.

In one embodiment, the filter 16 may comprise the combination of a capacitor 31 placed in parallel across the rectified DC bus 25, and an inductor in series with the rail of the DC bus. The capacitor 31 may comprise an electrolytic capacitor or a similar capacitor to smooth ripples that might otherwise appear on the DC bus 14. In one configuration, the frequency response of rectifier 12, the filter 16 or both is selected to reduce or attenuate unwanted harmonics in the generated electrical energy of the primary generator 42 by a minimum amount at the DC bus 14.

The inverter 26 may comprise one or more semiconductors arranged in a switch mode configuration. The inverter 26 may chop or process the DC signal on the DC bus 14 to output an alternating current (AC) output signal suitable for the drive motor 28. In one example, the inverter 26 provides a variable frequency drive signal with one or more phases for the motor 28, In another example, the inverter 26 supports the pulse-width modulation of the inputted DC signal to produce the AC output signal for driving the motor 28. The frequency or pulse width of the pulse width modulation signal may be varied to control a speed of the motor 28.

In one example, the converter 30 (e.g., DC-DC converter) may comprise a Buck converter. The converter 30 accepts a DC input voltage and provides a different DC output voltage at the output port 31. The output port 31 may used to power auxiliary electronics, components, electric fans, electric motors, electric fuel pumps, electric pumps, or other electrical or electronic devices or vehicular accessories besides the drive motor 28. Further, the converter 30 may provide noise isolation or regulation of the voltage at the output port 31.

Although the configuration of FIG. 2 illustrates the converter 30 as a step-down Buck converter in which the DC voltage level from the DC bus 14 is generally decreased, any configuration of converter 30 may be used and falls within the scope of the invention. For example, interchanging the diode 35 and inductor 37 in the circuit converter of FIG. 2 results in a step-up Buck converter or boosting Buck converter 30 in which the DC voltage level at the output port 31 is greater than that of the DC bus 14. Other types of DC converters for DC-DC converter 30 include inverting, push-pull, half-bridge and full bridge, among other possibilities. Some DC converters may support bidirectional current flow with voltage regulated output for output port 31, such that an energy storage device (e.g., battery of a desired voltage level or range) could be coupled across the output port 31 to provide reserve electrical energy for the drive motor 28.

In one embodiment, the system and method controls a rotational speed of a rotor or shaft of the turbogenerator 10 in accordance with a present voltage level associated with a direct current bus 14. A monitor 46 or another data processor establishes a lower threshold and a higher threshold for a speed of a rotor or shaft of a turbogenerator. The lower threshold and the higher threshold define the desired speed range for operation of the turbogenerator 10. The lower threshold and higher threshold may be programmed into the monitor 46 as a factory setting for the particular turbogenerator 10, for example. The speed sensor 44 determines speed data or a speed signal for a rotor or shaft associated with a turbogenerator 10. A voltage regulator 34 or motor controller 32 adjusts a voltage level or voltage operating point associated with a direct current bus 14 within a target voltage range if the speed data or speed signal indicates that the speed is above the higher threshold or below the lower threshold. If the speed data or signal indicates a speed below a lower threshold, a voltage regulator 34 increases a voltage level associated with the direct current bus level within a target voltage range to adjust a speed of the rotor or shaft of the turbogenerator 10. However, if the speed data or signal indicates a speed above a higher threshold, a voltage regulator 34 decreases the voltage level associated with the direct current bus level within a maximum target to adjust the speed of the rotor or shaft of the turbogenerator 10.

In one embodiment, the primary generator 42 has one or more coils (e.g., windings) that are rotated by the turbine 40 in a rotational direction to produce an output current. As the shaft or rotor of the primary generator 42 is rotated in one rotational direction, a counter-torque opposes the rotational direction. The degree of counter-torque induced by generated current in the coils is generally proportional to the output current or load current of the primary generator 42. The voltage regulator 34 may affect the load current associated with a turbogenerator output of turbogenerator 10 by changing the voltage level or voltage operating point associated with the direct current (DC) bus 14. As the voltage level associated with the direct current bus 14 is increased, the load current generally decreases such that the counter-torque is reduced; hence, the rotational speed of the rotor or shaft of the turbogenerator 10 is increased. As the voltage level associated with the direct current bus 14 is decreased, the load current generally increases such that the counter-torque is increased; hence, the rotational speed of the rotor or shaft of the turbogenerator is reduced.

Figure 3:
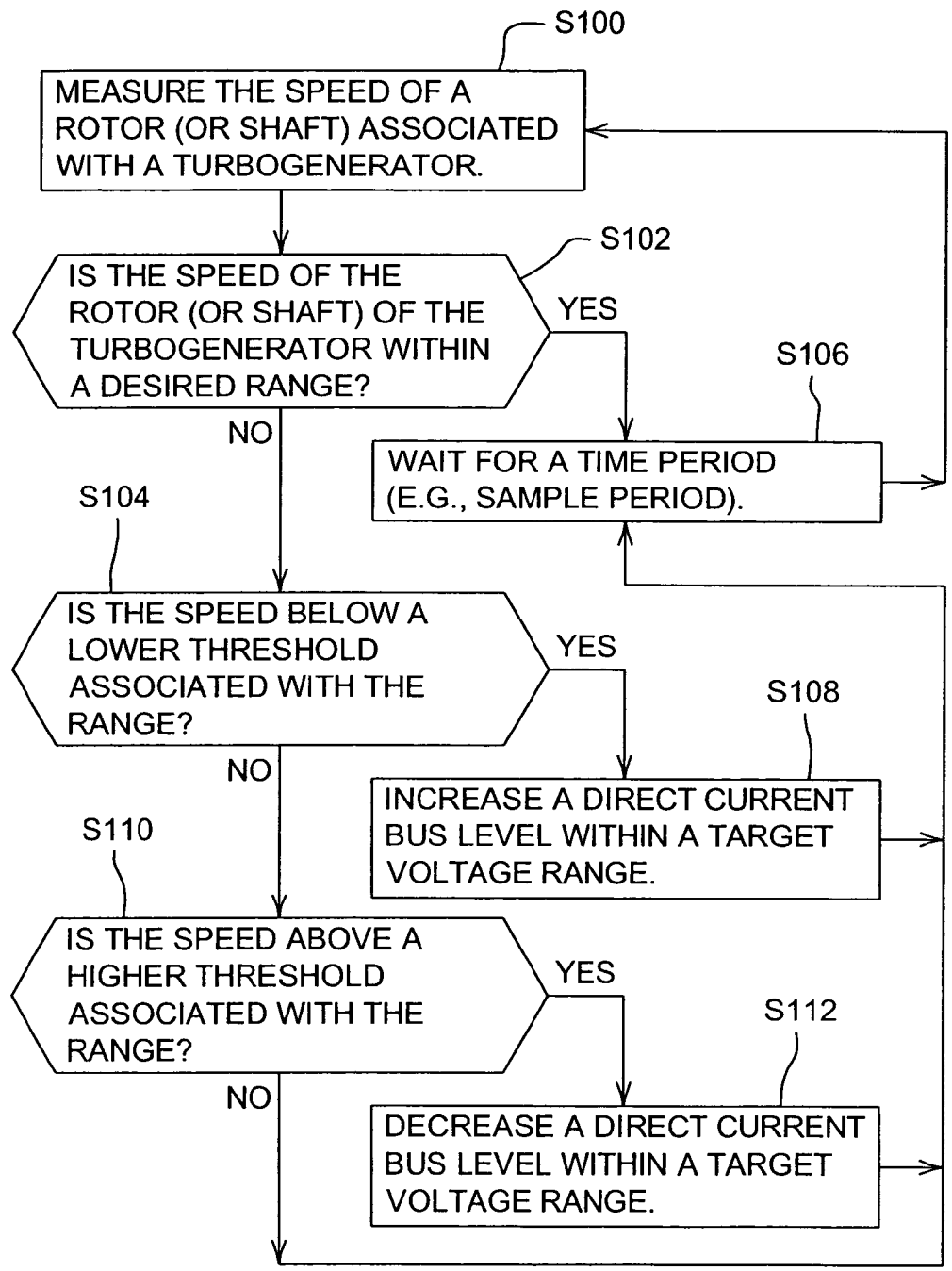
FIG. 3 is a flow chart of a first embodiment of a method for adaptively controlling a rotational speed of a rotor.

FIG. 3 is a method for controlling a speed of a rotor or shaft associated with a turbogenerator. The system of FIG. 1 or FIG. 2 may be used to carry out the method of FIG. 3. The method of FIG. 3 begins in step S100.

In step S100, a speed sensor 44 or monitor 46 measures the speed of a rotor or shaft associated with a turbogenerator 10 that feeds the DC bus 14. For example, the speed sensor 44 detects the speed or velocity of a rotor or shaft associated with the turbine 40 or primary generator 42 of the turbogenerator 10.

In step S102, the monitor 46 determines if the speed of the rotor or the shaft of the turbogenerator 10 is within a desired range. The desired range may be defined by a minimum speed or lower threshold, which establishes a lower velocity limit, and a maximum speed or upper threshold, which establishes an upper velocity limit. The user may determine the desired range based on field tests, empirical studies, turbine specifications of the turbine 40, generator specifications of the primary generator 42 such that the turbine 40, the primary generator 42 or both are kept in desired operational ranges for the reliable generation of electrical energy. If the speed of the rotor or the shaft of the turbogenerator 10 is not within the desired range, then the method continues with step S104. However, if the speed of the rotor or shaft of the turbogenerator is within the desired range, then the method continues with step S106.

In step S106, a timer, monitor 46, or speed sensor 44 waits for time period (e.g., a sample period) prior to taking another measurement sample of the speed of the rotor or shaft in step S100. For example, the speed sensor 44, monitor 46 or both wait for a sample time period prior to determining next speed data or a next speed signal for a rotor or shaft associated with a turbogenerator 10.

In step S104, the monitor 46 or another data processor determines if the speed is below a lower threshold associated with the range. If the monitor 46 determines the speed is below a lower threshold, then the method continues with step S108. However, if the monitor 46 determines that the speed is not below a lower threshold associated with the range, the method continues with step S110.

In step S108, a motor controller 32 or voltage regulator 32 increases a direct current (DC) bus level or voltage operating point associated with a DC bus 14 within a target voltage range. Step S108 may be carried out in accordance with various techniques that may be applied cumulatively, or individually. Under a first technique, the voltage regulator 32 may increase the voltage level or voltage operating point associated with the direct current (DC) bus 14 to a maximum voltage level associated with the target voltage range. Under a second technique, the voltage regulator 32 may increase the voltage level or operating point associated with the direct current (DC) bus to an elevated voltage level within the target voltage range that is consistent with one or more of the following: a desired voltage input level at an inverter input of the inverter 26, a desired output voltage at the inverter output of the inverter 26, a desired control voltage (e.g., root mean squared voltage (RMS)) for the motor 28, peak voltage, for one or more phases or coils) of the motor 28. The elevated voltage level is less than the maximum voltage level of the target voltage range.

In step S110, a monitor 46 or another data processor determines if the speed is above a higher threshold associated with the range. If the speed is above a higher threshold, then the method continues with step S112. However, if the speed is not above the higher threshold, the method continues with step S106.

In step S112, a motor controller 32 or voltage regulator 32 decreases a direct current (DC) bus level or voltage operating point associated with a DC bus 14 within a target voltage range. Step S108 may be carried out in accordance with various techniques that may be applied cumulatively, or individually. Under a first technique, the voltage regulator 32 may decrease the voltage level of the direct current (DC) bus 14 to a minimum voltage level or voltage operating point associated with the target voltage range. Under a second technique, the voltage regulator 32 may decrease the voltage level or voltage operating point associated with the direct current (DC) bus to a reduced voltage level within the target voltage range that is consistent with one or more of the following: a desired voltage input level at an inverter input of the inverter 26, a desired output voltage at the inverter output of the inverter 26, a desired control voltage (e.g., root mean squared voltage (RMS)) for the motor 28, peak voltage, for one or more phases or coils) of the motor 28. The reduced voltage level is greater than the minimum voltage level of the target voltage range.

After step S108 or step S112 is executed, as the case may be, the method continues with step S106. In this way, the speed of the rotor or shaft associated with the turbogenerator 10 is regularly (e.g., periodically) monitored or sampled to maintain efficient and reliable generation of electrical power.

Figure 4:
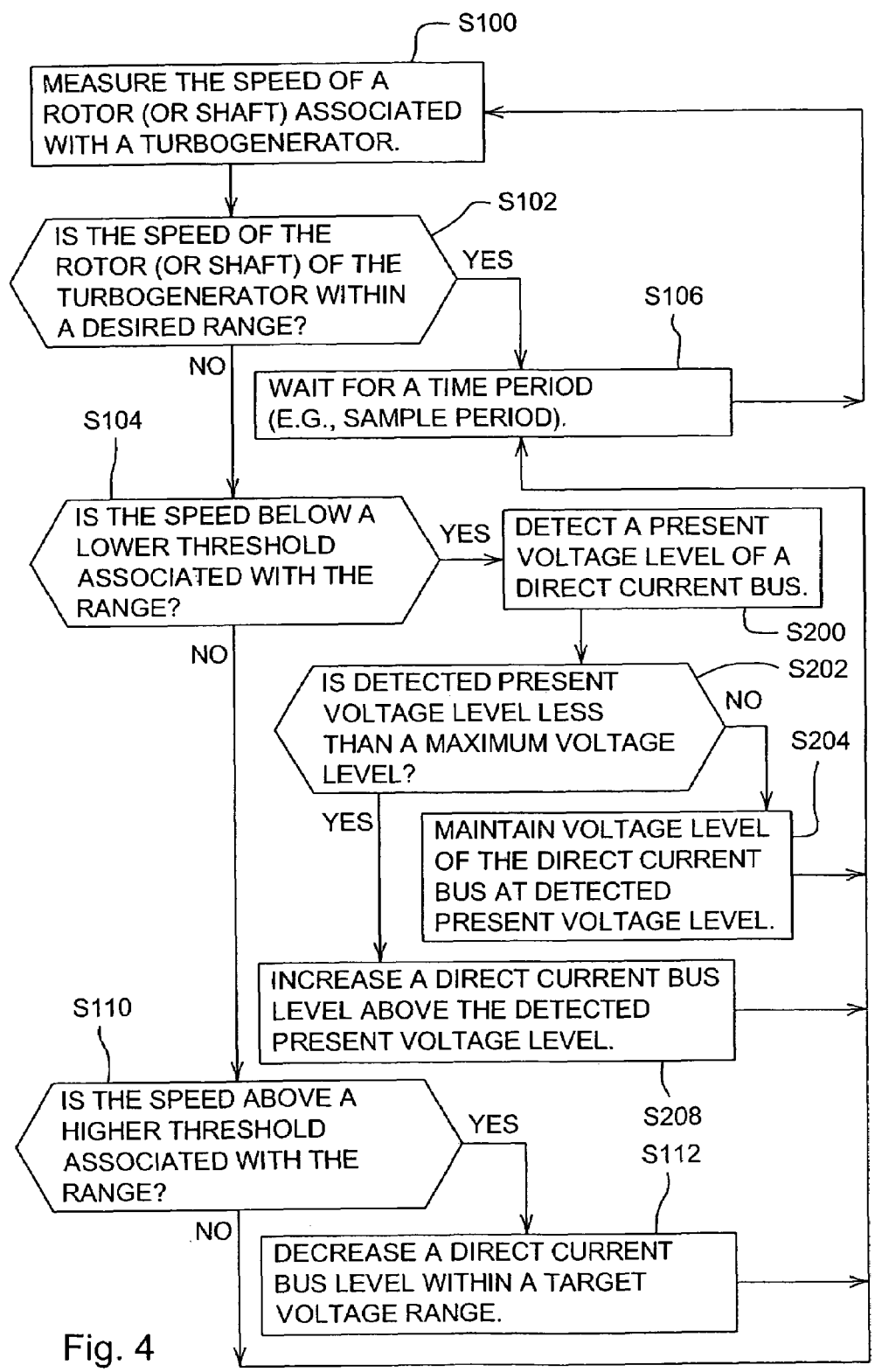
FIG. 4 is a flow chart of a second embodiment of method for adaptively controlling a rotational speed of a rotor.

The method of FIG. 4 is similar to the method of FIG. 3, except the method of FIG. 4 replaces step S108 with steps S200, S202, S204, and S208. Like reference numbers in FIG. 3 and FIG. 4 indicate like steps or procedures.

In step S200, a voltage detector 36 or motor regulator 32 detects a present voltage level associated with a direct current bus (e.g., DC bus 14).

In step S202, the voltage detector 36 or motor regulator 32 determines whether or not the detected present voltage level is less than a maximum voltage level of the target voltage range. In one embodiment, the maximum voltage level is established to be consistent or commensurate with one or more of the following: a desired voltage input level at an inverter input of the inverter 26, a desired output voltage at the inverter output of the inverter 26, a desired control voltage (e.g., root mean squared voltage (RMS)), peak voltage, for one or more phases or coils) of the motor 28. If the detected present voltage level is less than the maximum voltage level, then the method continues with step S208. However, if the detected present voltage level is not less than the maximum voltage level, then the method continues with step S204.

In step S208, the voltage regulator 34 or motor controller 32 increases a direct current bus level or voltage operating point above the detected present voltage level. In one example, the voltage regulator 34 or motor controller 32 increases the voltage level by one or more increments or voltage steps, not to exceed to the maximum voltage level of the target voltage range. In another example, the voltage regulator 34 or motor controller 32 increases the voltage level of the direct current bus (e.g., DC bus 14) to the maximum voltage level of the target voltage range.

In step S204, the voltage regulator 34 or the motor controller 32 maintains a voltage level or operating voltage point of the direct current bus (e.g., DC bus 14) at a detected present voltage level. For example, the voltage regulator 34 or the motor controller 32 may inhibit any increase or decrease of a voltage level or voltage operating point of the direct current bus (e.g., DC bus 14) that would cause the voltage level of the direct current bus 14 to fall outside the target voltage range.

After step S208, S204, or step S112 is executed, as the case may be, the method continues with step S106. In this way, the speed of the rotor or shaft associated with the turbogenerator 10 is regularly (e.g., periodically) monitored or sampled to maintain efficient and reliable generation of electrical power.

Figure 5:
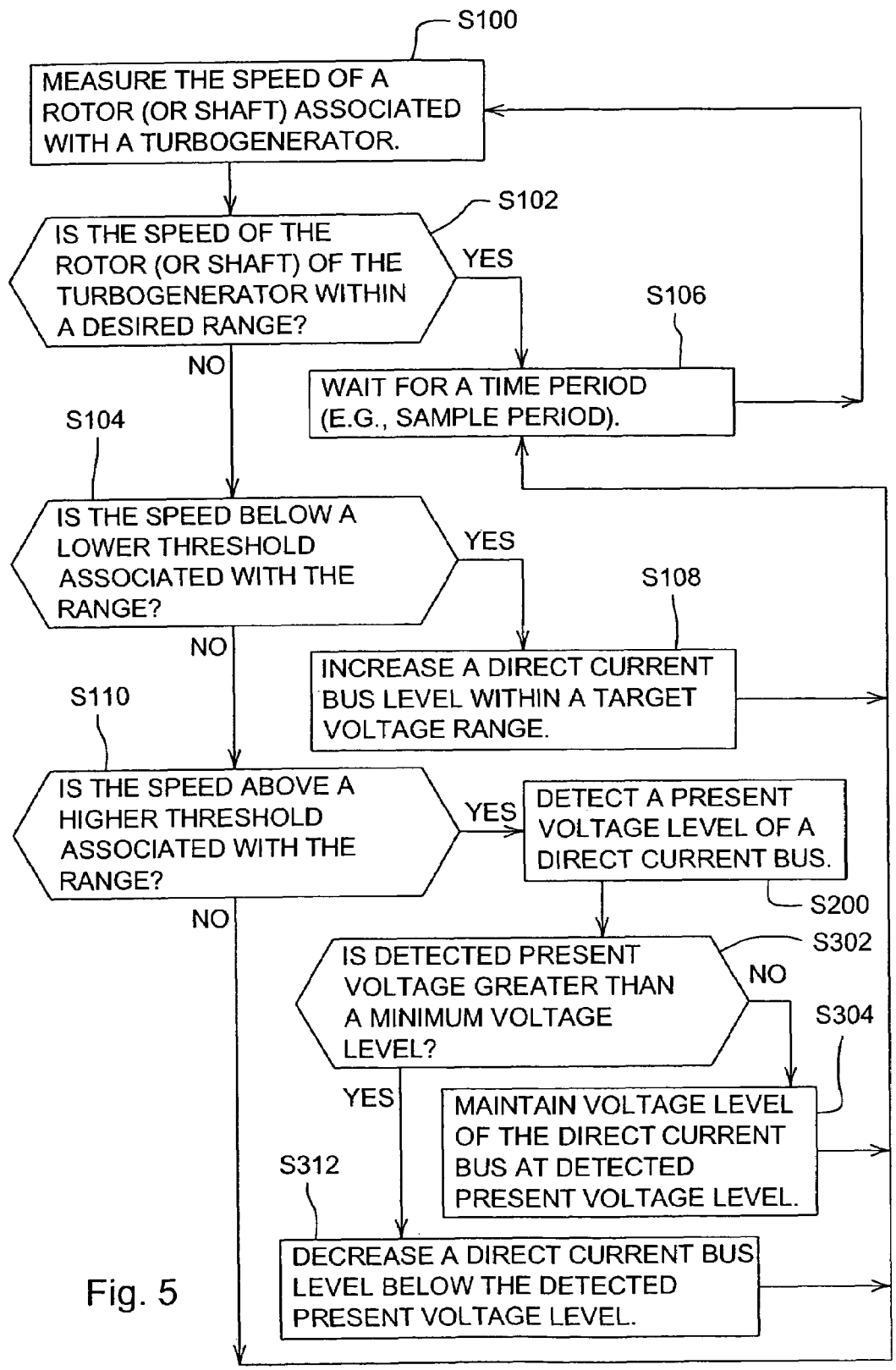
FIG. 5 is a flow chart of a third embodiment of a method for adaptively controlling a rotational speed of a rotor.

The method of FIG. 5 is similar to the method of FIG. 3, except the method of FIG. 5 replaces step S112 with steps S200, S302, S304, and S312. Like reference numbers in FIG. 3 and FIG. 5 indicate like steps or procedures.

In step S200, a voltage detector 36 or motor regulator 32 detects a present voltage level associated with a direct current bus (e.g., DC bus 14).

In step S302, the voltage detector 36 or motor regulator 32 determines whether or not the detected present voltage level is greater than a minimum voltage level of a target voltage range. In one embodiment, the minimum voltage level is established to be consistent or commensurate with one or more of the following: a desired voltage input level at an inverter input of the inverter 26, a desired output voltage at the inverter output of the inverter 26, a desired control voltage (e.g., root mean squared voltage (RMS)), peak voltage, for one or more phases or coils) of the motor 28. If the detected present voltage level is greater than a minimum voltage level, then the method continues with step S312. However, if the detected present voltage level is not greater than the minimum voltage level, then the method continues with step S304.

In step S312, the voltage regulator 34 or motor controller 32 decreases a direct current bus level below the detected present voltage level. In one example, the voltage regulator 34 or motor controller 32 decreases the voltage level by one or more increments or voltage steps, not to fall below to the minimum voltage level of the target voltage range. In another example, the voltage regulator 34 or motor controller 32 decreases the voltage level of the direct current bus (e.g., DC bus 14) to the minimum voltage level of the target voltage range.

In step S304, the voltage regulator 34 or the motor controller 32 maintains a voltage level or voltage operating point of the direct current bus (e.g., DC bus 14) at a detected present voltage level. For example, the voltage regulator 34 or the motor controller 32 may inhibit any increase or decrease of a voltage level or voltage operating point of the direct current bus (e.g., DC bus 14) that would cause the direct current bus level to fall outside the target range.

After step S108, S304, or step S312 is executed, as the case may be, the method continues with step S106. In this way, the speed of the rotor or shaft associated with the turbogenerator 10 is regularly (e.g., periodically) monitored or sampled to maintain efficient and reliable generation of electrical power Having described the preferred embodiment, it will become apparent that various modifications can be made without departing from the scope of the invention as defined in the accompanying claims.

The following is claimed:

1. A method for controlling a rotational speed of a rotor or shaft of a turbogenerator, the method comprising:
    establishing a lower threshold and a higher threshold for a speed of a rotor or shaft of a turbogenerator;
    determining speed data or a speed signal for a rotor or shaft associated with a turbogenerator; and
    adjusting a voltage level associated with a direct current bus within a target voltage range if the speed data or speed signal indicates that the speed is above the higher threshold or below the lower threshold.

2. The method according to claim 1 wherein the adjusting comprises:
    increasing the voltage level associated with the direct current bus within the target voltage range if the speed data or the speed signal indicates that the speed is below the lower threshold.

3. The method according to claim 1 wherein the adjusting comprises:
    decreasing the voltage level associated with the direct current bus level within the target voltage range if the speed data or the signal indicates that the speed is above the higher threshold.

4. The method according to claim 1 further comprising:
    detecting a present voltage level associated with the direct current bus.

5. The method according to claim 4 wherein the adjusting further comprises:
    increasing the voltage level of the direct current bus to an elevated voltage level above the detected present voltage level if the detected present voltage level is less than a maximum voltage level associated with the target voltage range.

6. The method according to claim 4 wherein the adjusting further comprises:
    decreasing the voltage level of the direct current bus to a reduced voltage level below the detected present voltage level if the detected present voltage level is greater than a minimum voltage level associated with the target voltage range.

7. The method according to claim 1 further comprising:
    determining if the speed of the shaft or rotor of the turbogenerator is within a desired range bounded by the lower threshold and the higher threshold; and
    waiting for a sample time period prior to determining next speed data or a next speed signal for the rotor or the shaft associated with the turbogenerator if the determined speed of the shaft or rotor is within the desired range.

8. The method according to claim 1 wherein the adjusting comprises:
    inhibiting any increase or decrease of the direct current bus level that would cause the direct current bus level to fall outside the target voltage range.

9. A system for controlling a rotational speed of a rotor or shaft of a turbogenerator, the system comprising:
    a monitor for establishing a lower threshold and a higher threshold for a speed of a rotor or shaft of a turbogenerator;
    a speed sensor for determining speed data or a speed signal for the rotor or the shaft associated with a turbogenerator; and
    a voltage regulator for adjusting a voltage level of a direct current bus within a target voltage range if the speed data or the speed signal indicates that the speed is above the higher threshold or below the lower threshold.

10. The system according to claim 9 wherein the voltage regulator increases the voltage level associated with the direct current bus within the target voltage range if the speed data or the speed signal indicates that the speed is below the lower threshold.

11. The system according to claim 9 wherein the voltage regulator decreases the voltage level associated with the direct current bus level within the target voltage range if the speed data or the signal indicates that the speed is above the higher threshold.

12. The system according to claim 9 further comprising a voltage detector for detecting a present voltage level associated with the direct current bus.

13. The system according to claim 12 wherein the voltage regulator increases the voltage level of the direct current bus to an elevated voltage level above the detected present voltage level if the detected present voltage level is less than a maximum voltage level associated with the target voltage range.

14. The system according to claim 12 wherein the voltage regulator decreases the voltage level of the direct current bus to a reduced voltage level below the detected present voltage level if the detected present voltage level is greater than a minimum voltage level associated with the target voltage range.

15. The system according to claim 9 wherein the speed sensor determines if the speed of the shaft or rotor of the turbogenerator is within a desired range bounded by the higher threshold and the lower threshold; and the monitor waits for a sample time period prior to determining next speed data or a next speed signal for the rotor or the shaft associated with the turbogenerator if the determined speed of the shaft or the rotor is within the target voltage range.

16. The system according to claim 9 wherein the voltage regulator inhibits any increase or decrease of the direct current bus level that would cause the direct current bus level to fall outside the target voltage range.

* * * * *